Feb. 11, 1969   A. L. RENKEY ET AL   3,427,390
INDUCTION FURNACE CONSTRUCTION
Filed Jan. 9, 1967
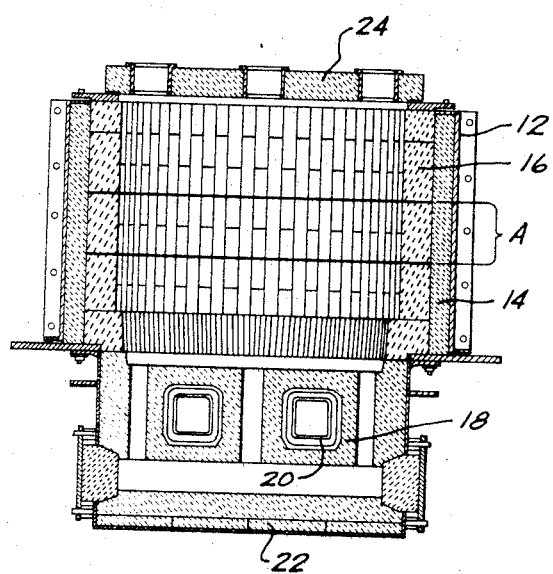
INVENTORS.
ALBERT L. RENKEY &
PETER T. TROELL
BY
ATTORNEY __United States Patent Office__

3,427,390
Patented Feb. 11, 1969

3,427,390
INDUCTION FURNACE CONSTRUCTION
Albert L. Renkey and Peter T. Troell, Pittsburgh, Pa., assignors to Dresser Industries, Inc., Dallas, Tex., a corporation of Delaware
Filed Jan. 9, 1967, Ser. No. 607,951
The portion of the term of the patent subsequent to Sept. 24, 1985, has been disclaimed
U.S. Cl. 13—35        3 Claims
Int. Cl. H05b *5/00*

ABSTRACT OF THE DISCLOSURE

An induction furnace construction in which the slag contact zone is composed of refractory brick containing at least 50% of fused grain.

---

Induction furnaces in the United States are growing rapidly both in number and capacity, particularly in the ferrous metal working industry. This growth has come after a dormant period of almost three generations, and has resulted from: (1) a great demand for clean, closely controlled products as steel enters its second century, and (2) marked improvements in the equipment and materials required for economic induction furnace operation.

One of the rather startling developments in induction furnace practice has been the trend towards considerably larger vessels; for example, furnaces of over two hundred tons capacity. Of course, this recent trend towards considerably larger vessels and more automated and superior control arrangements has had a serious effect on refractories previously used to line such furnaces. One result has been use of higher purity refractory materials; but even this has not been the complete answer.

Rammed linings previously have been considered the most desirable form of construction for an induction furnace. A rammed lining has been considered desirable, because it was monolithic in character, i.e., there were no cracks or joints through which molten metal could penetrate to coils, cooling conduits, and the like. The propensity of many ramming mixes to shrink has also been considered desirable because this provided a more dense, impervious, lining structure.

However, in very large vessels, monolithic linings have just not been as satisfactory as desired. Not only have the labor and material requirements for the formation of monolithic linings been extremely distasteful, but for some unknown reason, there appears to be greater propensity in these larger vessels for the rammed monolith to crack and in other ways rapidly deteriorate.

Refractory linings, in any type of furnace should have the ability to chemically and physically resist deterioration in service. Chemical resistance is accomplished by judicious selection of refractory ingredients. For example, basic refractory, such as dead burned periclase or magnesia, is used to fabricate the refractory lining when a chemically basic service environment is expected. Non-basic or acid type refractory is selected when an acid environment is expected; for example, a high alumina refractory. "High alumina" is understood by those skilled in the art to infer $Al_2O_3$ containing materials containing at least about 50%, by weight, of $Al_2O_3$.

Physical properties or characteristics desirable in the refractory lining to provide optimum service include ability to resist penetration by molten metal and slags, ability to resist attack and penetration by effluent gases, ability to resist rapid and wide cyclic variation in temperature without spoiling or cracking, etc., volume stability, i.e., shrinkage or expansion due to change in the mineralogical character of the refractory when exposed to surface temperatures, is also an important consideration.

It has been discovered and it is upon this that this invention is largely predicated, that a working lining consisting substantially entirely of high alumina refractory shapes can be employed in the processing of iron and steel which produce high FeO containing slags and in the processing of bronze which produce high MnO containing slags by lining a circumferential band of the working lining of the vessel in the slag contact zone, with a selected refractory of the chemically basic type.

Accordingly, it is an object of the present invention to provide an improved induction furnace construction.

Another object of the invention is to provide an increased lining life in critical wear areas of an induction furnace.

Other objects of the invention will, in part, become apparent hereinafter.

In order to more fully understand the nature and objects of the invention, reference should be had to the following detailed descriptions and drawings, the single figure of which is a schematic elevation view in cross-section, of a typical core type induction furnace.

The core type induction furnace contains a primary coil surrounding a laminated core. The secondary consists of molten metal in a channel surrounding a primary coil. The coreless induction furnace consists of a primary (the furnace coil), and a secondary (the molten metal). When an alternating current is supplied to the primary a current is induced in the secondary. The induced current rapidly heats the metal bath and melts any scrap or other solid metal in the charge. While the invention will be described with respect to a core type furnace, it should be appreciated that it also extends to coreless furnaces.

In accordance with the present invention there is provided an induction furnace consisting essentially of an outer metal shell in the form of an open topped tubular vessel, a refractory tank lining adjacent the shell and a refractory working lining adjacent the tank lining, said working lining containing a circumferential slag line in the slag contact zone composed of ceramically bonded refractory shapes containing a preponderance (at least 50%) of fused grain which analyzes on an oxide basis, 15 to 25% $Cr_2O_3$, 45 to 75% $MgO$, 4 to 20% $Al_2O_3$, 3 to 15% $FeO$, 0.5 to 3% $SiO_2$ and up to 3% $CaO$. The molar ratio of $CaO$ to $SiO_2$ in said material is no greater than about 2:1. The refractory material is characterized petrographically as comprising predominantly, relatively large, abutting grains of periclase, crystals of spinel contained within said periclase grains and isolated pockets of silicates contained within the periclase grains. The balance of the brick may be composed of dead burned magnesite or chrome ore or mixtures thereof. The remainder of the working lining is fabricated from ceramically bonded high alumina refractory brick.

The refractory brick in the critical slag line wear areas of the induction furnace is prepared from what we refer to as fused magnesite-chrome grain. The components are melted, resolidified and then comminuted before pressing and burning. The melting and resolidification of the chrome ore-magnesia mixture must be preformed in a manner which insures a formation in the refractory product of a structure as previously described. This is preferably and conveniently accomplished in an electric furnace.

In practice, a chrome ore-magnesia mix, i.e., 40% chrome ore, 60% $MgO$, is continuously fed into a conventional electric furnace which is heated by one or more carbon electrodes and the electrodes are gradually raised and withdrawn as a melt is formed in order to permit slow and gradual resolidification of a melted material. It is essential in the present invention that the melt be rather slowly solidified so as to permit the formation of a particular structure required in the refractory, viz. large abutting periclase grains, spinel crystals contained within the periclase grains, and silicate material distributed in isolated pockets surrounded by periclase. The slow resolidification promotes nucleation and growth of large periclase grains and results in the formation of an equilibrium structure which is stable throughout the usual operating temperatures encountered in service, i.e., up to 1750° C.

Although slow solidification of the melt is essential, once solidification has occurred, the solid hearth material should be cooled rather quickly to room temperature very soon after it is formed, preferably within about 2 hours in order that thermal stresses are set up in the solidified refractory material so that the crushability of the material is greatly enhanced. That is to say, the solidified refractory material is prestressed by the quick cooling which reduces the amount of energy required in subsequent crushing operations. This feature, in conjunction with the characteristically large size of the periclase grains, facilitates crushing of the material and avoids the formation of excessive fines.

The cooling of the refractory material is conveniently accomplished by water cooling the shell of the furnace in which the solidified material is contained.

In any event, slow and gradual solidification of the melt and rapid cooling of the solidified material is essential whereas quick freezing and slow cooling of the solidified material is to be avoided. Otherwise, the required equilibrium structure in the refractory material is not achieved and the advantageous properties of the shapes are not obtained.

The mass of solid refractory material obtained by the foregoing procedure is broken out of the furnace after cooling and cleaned and crushed to the desired size by any suitable techniques. The resulting particulate refractory material is characterized by high density, low porosity, and toughness, which properties are attributed to its composition, structure, and method of formation.

The preferred compositional ranges for the magnesite-chrome fused grain refractory material is 0.5 to 1.5% $SiO_2$, up to 1.0% CaO, 60 to 70% MgO, 5 to 10% FeO, 14 to 20% $Cr_2O_3$ and 4 to 10% $Al_2O_3$.

As is set forth above, the balance of the working lining consists of high alumina refractory shapes. For example, a suitable high alumina refractory is disclosed and claimed in United States Patent No. 3,067,050, to Miller, assigned to the present assignee. The refractory shapes of this patent consist of from 1 to 10% of volatilized silica and the remainder a coarse ground alumina refractory material having less than about 1.3% iron oxide. Another suitable refractory is one composed of about 80% calcined bauxite, 15% calclined alumina, 5% clay bonded with phosphoric acid and burned.

The following examples illustrate more clearly the preparation and properties of the fused grain aggregate.

EXAMPLE I

A mixture was prepared containing 40% Transvaal chrome ore and 60% of low calcined caustic sea water magnesia. The composition of the ore and magnesia are set forth in Table I below.

TABLE I

|  | Chrome Ore, Percent | Caustic Magnesia, Percent |
|---|---|---|
| $SiO_2$ | 1.6 | 1.5 |
| CaO | 0.5 | 1.0 |
| MgO | 10.8 | 97.1 |
| FeO | 25.1 | 0.3 |
| $Cr_2O_3$ | 46.0 |  |
| $Al_2O_3$ | 14.2 | 0.1 |

The mixture was prepared in 5000 pound lots and was melted and re-solidified in a single phase, two-electrode furnace having a water-cooled shell which was lined interiorly with partially fused magnesia-chrome ore material. The mix was fed continuously over a period of time into the furnace in the usual manner of "making a hearth" and a pool of molten material was developed in the furnace. The electrodes were gradually withdrawn as the melting proceeded with the result that the molten material gradually and slowly solidified in the furnace to "form a hearth." When the melting and resolidification of the material was completed, the solidified material was quickly cooled in the furnace by means of the cooling water provided in the furnace shell. The cooling to about room temperature took less than about 2 hours, after which the hearth material was broken out, cleaned, and then particulated into 1 in. x D lumps.

The refractory material obtained contained by analysis.—$SiO_2$, 1.38; CaO, 1.57; MgO, 62.55; FeO, 10.64; $Cr_2O_3$, 18.21; $Al_2O_3$, 5.78.

This material was then passed through a two step gyratory crushing and part of the resulting material was processed through a vibrating mill to obtain a desired particle size distribution.

The sizing of the material obtained was as shown in Table II.

TABLE II

| Proportion, percent | Particle size, mesh |
|---|---|
| 28 | ½ +¼ |
| 15 | 4+8 |
| 16 | 8+20 |
| 15 | 20+60 |
| 6 | 60+150 |
| 5 | 150+325 |
| 15 | 325 |

Screening was not necessary to obtain the above distribution and the distribution can be readily reproduced due to the substantially uniform nature of the material.

The sized material was subsequently mixed in a rotating mixer with 2.5 to 3%, by weight, of an aqueous 40% solution of Bindarene, a lignin sulfonate binder. A weighed amount of the mix was pressed to approximately 10,000 p.s.i. in a steel die to produce a brick 9" x 2½" x 4½". The pressed brick was dried in a tunnel drier at 110° C. After drying, the brick was fired at 1600° C. for 3 hours to develop a ceramic bond between the refractory particles. It was found that the brick had sufficient strength for handling and installation and could be used directly in electric furnace construction.

Magnesite-chrome fused grain shapes made in accordance with the above had apparent porosities between about 14 and 17%, a 25 p.s.i. load deformation at 1600° C. of from about 0.8 to 1.2 and excellent resistance to FeO and $MnO_2$ containing slags.

EXAMPLE II

Fused grain samples were prepared for microscopic analysis. The chemical analysis of sample A was 1% $SiO_2$, 5.9% $Al_2O_3$, 20.4% $Cr_2O_3$, 60.7% MgO, 10.4% FeO and 0.7% CaO. The chemical composition of sample B was 14.59% $Cr_3O$, 71.45% MgO, 4.37% $Al_2O_3$, 7.11% FeO, 0.9% $SiO_2$ and 1.61% CaO.

Microscopically, sample A showed periclase grain appearing as a gray background. The grain contained numerous exsolved dendrites of mixed spinel and some euhedral crystals of spinel. Isolated pockets of silicates occurred throughout the grain. Cleavage lines or fractures, which are typical of periclase occurred in cleavage planes within the periclase grain. Sample B revealed portions of abutting periclase grains and the cleavage pits of the respective grains which appeared to intersect upon extension at an angle of about 26°. Further, the grain revealed the silicate material to occur in discontinuous isolated pockets separated by periclase and spinel crystals and are contained in the periclase grains.

The advantageous properties, high density, low porosity, low gas permeability, reheat stability, superior resistance to spalling, high strength at elevated temperatures, high resistance to molten iron oxide and slags, and high resistance to corrosion from furnace gases in brick made from these fused grain are directly attributable to the structure and composition of the grain.

The strength of the brick is enhanced since the silicates in the constituent refractory material occur in pockets which act to relieve the stresses to which the brick are subjected in furnace operation. Also, since the silicates do not occur in a continuous phase, there is substantially no weakening of the brick at higher temperatures when the silicates are fluidized. This is due to the fact that the structure of the constituent refractory material comprises essentially a crystal to crystal bond.

The presence of silicates in pockets instead of a continuous phase also enhances the reheat stability and resistance to molten iron oxide and slags.

Accordingly, the prescribed compositional ranges for the magnesia-chrome fused grain refractory material are critical.

Referring to the drawings, there is shown a typical core type low frequency induction furnace. The furnace consists of an outer metal shell 12 with a refractory tank lining 14 adjacent the shell and a refractory working lining 16 adjacent the tank lining. At the bottom of the furnace are inductor blocks 18 containing throats 20 through which the molten metal passes. The area A designates the slag line which extends along the entire circumference of the walls approximately centrally between the top and bottom of the furnace heating chamber.

The working lining 16 is lined with ceramically bonded high alumina refractory brick. The circumferential slag line A is lined with the fused grain refractory brick heretofore described. The tank lining 14 may be lined with any suitable insulating brick rated for about 3000° F., as is the refractory lining 22 below the inductor blocks 18. The throats 20 leading into the inductor blocks are generally rammed with high purity alumina or magnesia monoliths, as are the inductor block linings themselves. The roof 24 of the vessel is usually composed of a castable refractory material.

While the supporting lining of the induction furnace may vary depending upon the tonnage of the vessel required, the combination of a ceramically bonded high alumina refractory lining containing a fused grain slag line appeared to extend service life, balance the service life and afford the best economy.

Having thus described the invention in detail and with sufficient particularity as to enable those skilled in the are to practice it, what is desired to have protected by Letters Patent is set forth in the following claims.

We claim:
1. An induction furnace consisting of an outer metal shell, a refractory tank lining on the interior walls of the shell along the side walls and bottom, and a working lining along the side walls adjacent the tank lining along the furnace bottom, said working lining along the side walls containing a circumferential slag line in the slag contact zone fabricated of ceramically bonded, refractory shapes containing at least 50% of fused grain which analyzes, on an oxide basis, 15 to 25% $Cr_2O_3$, 45 to 75% MgO, 4 to 20% $Al_2O_3$, 3 to 15% FeO, 0.5 to 3% $SiO_2$, and up to 3% CaO, the molar ratio of CaO to $SiO_2$ in said material being no greater than about 2:1, the refractory material being characterized petrographically as comprising predominantly, relatively large, abutting grains of periclase, crystals of spinel contained within said periclase grains and isolated pockets of silicates contained within the periclase grains, the remainder of the side walls and bottom being fabricated from ceramically bonded, high alumina refractory brick.

2. The furnace of claim 1 in which the fused grain analyzes on an oxide basis, 0.5 to 1.5% $SiO_2$, up to 1% CaO, 60 to 70% MgO, 5 to 10% FeO, 14 to 20% $Cr_2O_3$ and 4 to 10% $Al_2O_3$.

3. The furnace of claim 1 in which the remainder of the shapes containing the fused grain is composed of a material selected from the group consisting of dead burned magnesia, chrome ore and mixtures thereof.

References Cited
UNITED STATES PATENTS 3,116,156 12/1963 Charvat _____ 106—59
3,164,657 1/1965 Shaw et al. _____ 13—9

BERNARD A. GILHEANY, *Primary Examiner.*

R. N. ENVALL, JR., *Assistant Examiner.*

U.S. Cl. X.R.

106—59; 266—43